Jan. 7, 1964   C. KUEHNE   3,116,886
PHOTOSENSITIVE ELECTRO-OPTICAL MICROMETERS FOR ROTARY AXLES
Filed Aug. 2, 1961   3 Sheets-Sheet 2

INVENTOR.
CHRISTOPH KUEHNE
BY
J. Russell Juten
ATTORNEY

Jan. 7, 1964 C. KUEHNE 3,116,886
PHOTOSENSITIVE ELECTRO-OPTICAL MICROMETERS FOR ROTARY AXLES
Filed Aug. 2, 1961 3 Sheets-Sheet 3

INVENTOR.
CHRISTOPH KUEHNE
BY
*J. Russell Juten*
ATTORNEY

United States Patent Office 3,116,886
Patented Jan. 7, 1964

3,116,886
PHOTOSENSITIVE ELECTRO-OPTICAL MICROMETERS FOR ROTARY AXLES
Christoph Kuehne, Hochstedt, near Hanau, Germany, assignor, by mesne assignments, to Keuffel & Esser Company, Hoboken, N.J.
Filed Aug. 2, 1961, Ser. No. 128,776
Claims priority, application Germany Aug. 2, 1960
6 Claims. (Cl. 250—231)

The present invention relates to a device for accurate automatic readout of the angular position of a rotary axle carrying a graduated circle and having a device for coarse readout and a device for fine readout capable of picking-up two points of the graduated circle, said points for example being 180° apart. Photometric means are used for determining the position of the graduation lines, these photometric means also being used for controlling the means for displacement of these lines (preferably optical means causing apparent or pseudo-displacement only i.e. preferably the image of the line is displaced) in relation to the photometric means. The present invention also refers to a device for automatic setting of the rotary axle to a predetermined angular value.

Some prior art devices for angle readout have been proposed where one readout point is projected onto the other so that the images of the graduation lines of one readout point appear at the extensions of the graduation lines of the other point, or rather slightly laterally displaced on account of graduation errors. Those parts of the graduated circle which carry the lines for both readout points are imaged by means of an optical deviating element and a beam splitter in a plane containing the knife edge of an image dividing element. The distance from the knife edge to a point halfway between the images of the two graduation lines, transposed by 180 degrees, is used for the fine readout. For this purpose, the bundles of rays forming both image portions produced by the image splitting elements, may each be conducted to a photoelectric cell. Both cells are set-up in a differential voltmeter system. The voltage differential produced by them is the measuring unit for the displacement to be determined. These prior art devices have the disadvantage that the relationship of the voltage and the displacement is either not linear within a sufficiently wide range, or if approximately linear, that the sensitivity is subject to fluctuations. If, therefore, a higher degree of accuracy is required (on a circle with 1/6-graduation, an interpolation accuracy of $1.6 \times 10^{-3}$ is required for a readout of one second of arc) it is not possible to use the voltage as the measuring unit for the displacements. In some applications the voltage therefore has merely been used as an indicator for the correct setting of the optical light deviating elements and the degree of adjustment necessary for these elements has been used as the measuring unit for the displacement. Such adjustments are made by the operator. Such a set-up could be automated by using the voltage for the adjustment of the light deviating elements. An arrangement such as this, however, is quite costly, as the projection of the one reading point onto the other requires quite a number of expensive reflecting and imaging optical parts which also are very difficult to adjust. Also, the prism arrangement for achieving coincidence of the two images of the lines separated by 180 degrees is difficult to set-up.

It is one object of the present invention to eliminate these disadvantages. The present invention does this by providing a photometric device for each of the two points on the circle. Each of the photometric devices is optically aligned with two separate optical deviating elements which are disposed optically in series, and each moving independently from the other and each being placed in the path of the imaging rays of a point on the circle. Each of the two elements of one photometric device is paired-off with one of the elements of the other photometric device in such a manner that the elements of one pair are adjustable together in the same direction and that the elements of the other pair are adjustable opposite or with reference to each other. The former pair which causes apparent parallel displacement (image displacement) of the readout points is controlled by one of the photometric devices. The latter pair which causes an apparent displacement (image displacement) of the readout points opposite or relative to each other is controlled by the other photometric device. The position of these images is the measuring unit for the direct fine readout.

The attached drawings show some applications of the basic principles of the present invention.

Figure 1:
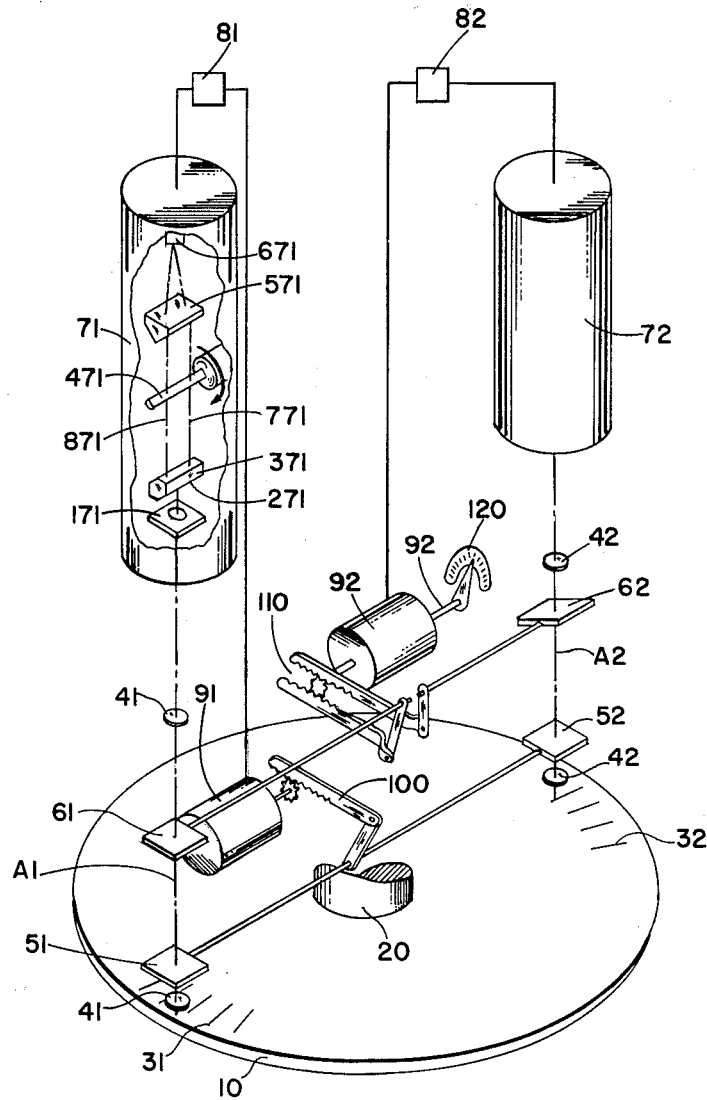
FIGURE 1 is a schematic isometric sketch of a readout device for determining the angular position of a rotary shaft.

As shown in FIGURE 1, the graduated circle 10 is coupled to axle 20, the angular position of which is to be determined. This axle 20 is connected to an optical device, which is not shown, which determines by means known in the art, that the two graduation lines 31 and 32 are positioned near the optical axes A1 and A2 of the readout device, i.e. the device not shown is a known coarse readout means. See Technical Bulletin 159, Instruction Manual for the Digisyn, Type RD-13B, Digital Shaft Position Encoder, Adcon Division, Wayne-George Corporation, Boston, Massachusetts; and "Principals and Applications of High Accuracy Shaft Angle Encoders," copyright 1959 by the Baldwin Piano Co. The optical elements such as lenses 41, 41' and 42, 42' form an image of lines 31 and 32 in imaging planes in photoelectric devices 71 and 72, which are described later. The rays pass through optical deviating means or elements which can be plano-parallel plates 51 and 61, and 52 and 62 respectively. The pair of plano-parallel plates 51, 52 are displaced together by control means such as motor 91 through gear 100, and motor 91 is controlled by photoelectric device 71 through amplifier 81. Each one of the pair of plano-parallel plates 61, 62 is rotated opposite to one another by gear 110 and motor 92 which is controlled by photoelectric device 72 through amplifier 82. The position of the motor shaft 92' is indicated by scale 120. The reading devices, photoelectric devices and plano-parallel plates form one constructional unit which remains substantially in the same position in relation to the rotary axle 20. The line between optical axes A1 and A2 defines the reference diameter against which the position of the circle 10, and thereby that of the axle 20, is measured.

The photoelectric device 71 comprises an aperture or diaphragm 171, an image splitting element 371 with knife edge 271, a rotating diaphragm or light chopping means 471, a focusing prism or collective prism 571 and photocell 671. Photoelectric device 72 is similar to photoelectric device 71.

The present invention operates somewhat as follows: The two split light beams 771 and 871 emanating from the two image portions exit parallel to each other from element 371, pass the focusing prism 571 and hit photocell 671. The rotating light chopper 471 located between image splitting element 371 and prism 571 permits only one of the two light beams at a time to reach the photocell 671. The photocell 671 therefore produces a signal of which two successive impulses always correspond to the two different light beams 771, 371. These impulses are compared in amplifier device 81. If the two successive impulses are equal, this indicates that the image of line 31 lies evenly disposed with respect to, or is coincident with, the knife edge 271. Amplifier device 81 at the same time controls motor 91 so that the graduation line image is brought into coincidence with the knife edge 271. Devices 72 and 82 operate in the same manner as devices 71 and 81.

Figure 2A:
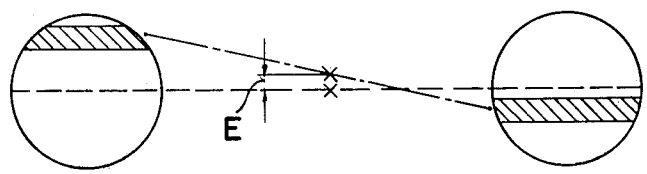
FIGURES 2A, 2B, 2C show how the device of FIGURE 1 operates.
Figure 2B:
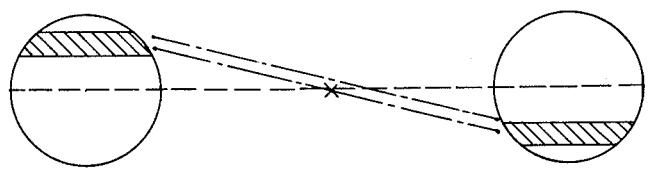
Figure 2C:
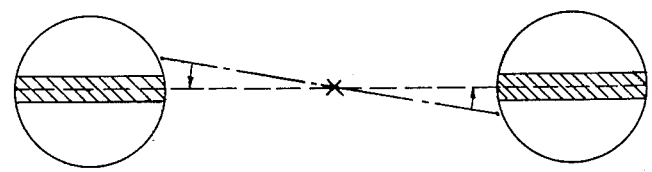

FIGURES 2A, 2B and 2C show the way in which this device operates. FIGURE 2A shows both fields of view of the reading device when there are no plano-parallel plates in the path of the rays, or when both plano-parallel plates are set to zero. "E" is the eccentricity of the circle graduation. This example shows clearly that the use of only one microscope for reading the circle would lead to errors. The interpolation value measured by the reading device on the left would be too large and that measured by the reading device on the right would be too small. The one pair of plano-parallel plates 51, 52 controlled by photoelectric device 71, causes parallel displacement of the image of the two graduation lines 31, 32 whereas the other pair of plano-parallel plates 61, 62 controlled by the photoelectric device 72, causes rotation of the images of graduated circle 10 so that, FIGURE 2C, both photoelectric devices are on zero and the movement of plates 61, 62 gives the desired fine readout. FIGURE 2B shows a hypothetical intermediate stage which would be visible if, after final adjustment, the pair of plano-parallel plates 61, 62 would be removed.

Figure 3:
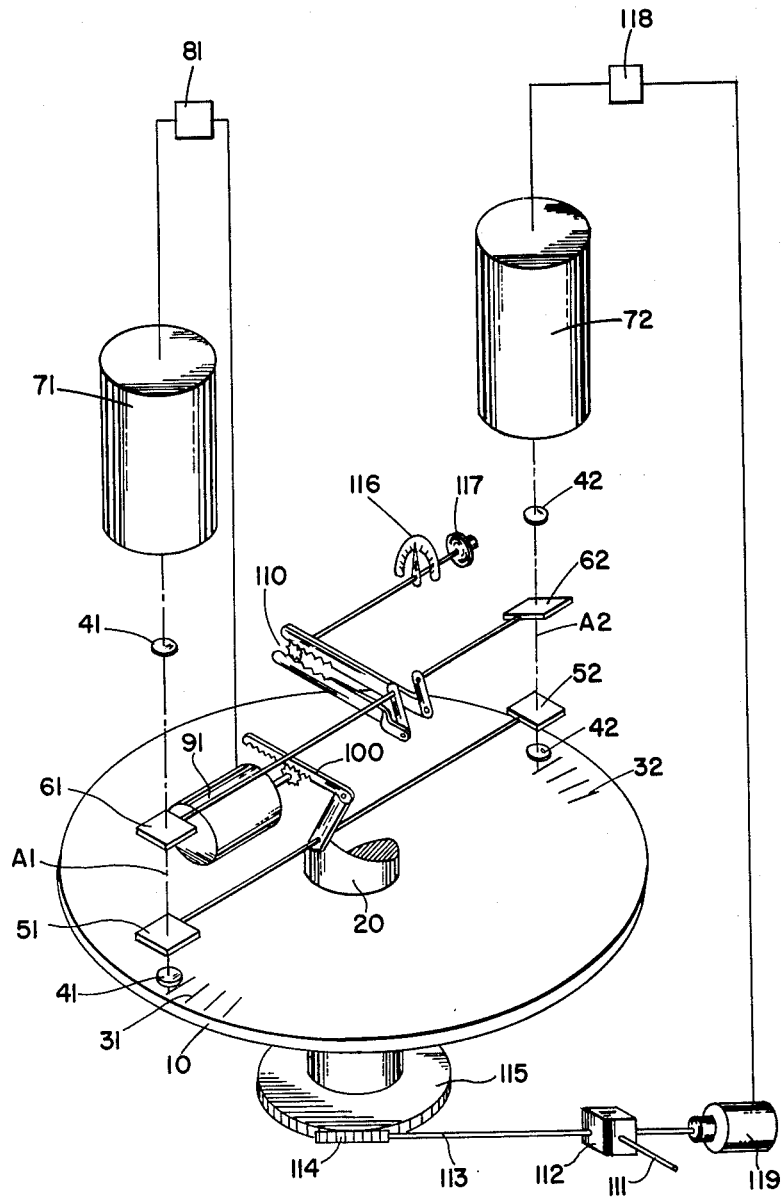
FIGURE 3 shows schematically a device of the present invention for setting a rotary axle to a pre-determined angular value.

FIGURE 3 shows an arrangement for automatic setting of axle 20 to a predetermined angle. The reference numbers used in FIGURE 3 for the various parts are identical to those of the same parts previously described with respect to FIGURE 1. First, axle 20 is coarsely adjusted. This is done by means of shaft 111 which can be connected to a counting device (not shown). The shaft 111 is connected to shaft 113 through gear 112. A turn of shaft 113 is transferred to axle 20 by means of a worm gear consisting of worm 114 and worm wheel 115 which is rigidly connected to axle 20. The pair of plano-parallel plates 61, 62 now serves to set the graduated circle 10 to a desired interpolation position. For this purpose, the interpolation value is set on scale 116 by means of knob 117. Photoelectric device 72 is connected to a servo-amplifier 118 which controls motor 119 so that axle 20 and with it circle 10, are brought into a position where the image of line 32 falls onto the knife edge of photoelectric device 72.

The invention is not restricted to the examples given. For instance, the apparent parallel displacement of the graduation lines by the plano-parallel plates can be replaced by an actual displacement in a direction perpendicular to the diameter to be measured. This can be done, for instance, by placing the entire optical and mechanical readout device on a sliding support. It is also possible to replace the apparent rotational movement of the graduation lines by actual movement. For this purpose, circle 10 must be supported in such a way that it can be turned by small amounts relative to shaft 20.

It is apparent that the described examples are capable of many variations and modifications within the scope of the present invention. All such variations and modifications are to be included within the scope of the present invention.

What is claimed is:

1. A device for the accurate automatic fine adjustment readout of the angular position of a rotary axle having a graduated circle and having a device for coarse readout, comprising photometric means for determining the position of two graduation lines, a first of said photometric means being disposed in position for receiving the image of a first of said two graduation lines, a second of said photometric means being disposed in position for receiving the image of the second of said two graduations lines, displacement means for causing apparent relative displacement between said photometric means and said graduation lines, and first control means for controlling apparent displacement between said first of said graduation lines and said first of said photometric means and between said second of said graduation lines and said second of said photometric means as a function of the position of said image of said first of said graduation lines on the first of said photometric means, and second control means for controlling apparent displacement between said first of said graduation lines and said first of said photometric means and between said second of said graduation lines and said second of said photometric means as a function of the position of said image of said second of said graduation lines on the second of said photometric means, whereby the images of said graduation lines on said photometric means tend to attain a centered equilibrium position, the relative positions of said images of said graduation lines in the field of view being a measuring of the fine adjustment in direct readout, whereby an accurate automatic interpolation of the angular position of said graduated circle is obtained.

2. A device in accordance with claim 1, wherein said displacement means comprises mechanical means for causing apparent parallel displacement between said photometric means and said graduation lines as a function of the position of said images of said lines on said photometric means.

3. A device in accordance with claim 1, wherein said displacement means comprises means for providing apparent rotational movement of said graduated circle with respect to said axle as a function of the position of said images of said graduation lines on said photometric means.

4. A device in accordance with claim 1, comprising rotation and setting means for rotating and setting said axle and said graduated circle to a predetermined angular value with respect to said photometric means, setting control means connected to said second photometric means and said rotating and setting means for controlling said rotating and setting means, whereby the predetermined angular setting of said axle and graduated circle may be controlled as a function of the position of the images of said graduation lines on said photometric means.

5. A device for the accurate automatic fine adjustment readout of the angular position of a rotary axle having a graduated circle and having a device for coarse readout, comprising photometric means for determining the position of two graduation lines, a first of said photometric means being disposed in position for receiving the image of a first of said two graduation lines, a second of said photometric means being disposed in position for receiving the image of the second of said two graduation lines, image displacement means for causing a displacement of the images of said two graduation lines with respect to said photometric means, said displacement means comprising a first pair of optical deviating elements and a second pair of optical deviating elements, said first pair of optical deviating elements comprising a first element and a second element coupled together for translation movement together in the same direction, said second pair of optical deviating elements comprising a first and second element coupled to each other for rotation in opposite directions, control means for controlling the displacement translation of said first pair of optical deviating elements as a function of position of said image of said first graduation line on said first photometric means and for controlling the rotational movement of said second pair of optical deviating elements as a function of the position of said image of said second graduation line on said second photometric means, said first element of said first pair of optical deviating elements and said first element of said second pair of optical deviating elements being disposed in series in the path of the rays of light from said first graduation line to said first photometric means, and said second element of said first pair of optical deviating elements and said second element of said second pair of optical deviating elements being disposed in series in the path of the rays of light from said second of said graduation lines to said second photometric means, translation of said first pair of optical deviating elements causing image displacement of said graduation lines with respect to said photometric means and said second pair of optical deviating elements causing image displacement of said graduation lines opposite to each other through rotational movement, whereby the images of said graduation lines on said photometric means tend to attain a centered equilibrium position, the relative positions of said diametrically opposed lines in the field of view being the measuring unit for the fine adjustment in direct readout, whereby an accurate automatic readout and interpolation of the angular position of said graduated circle is obtained.

6. A device for the accurate automatic readout of the angular position of a rotary axle having a graduated circle and having a device for coarse readout, comprising photometric means for determining the position of two graduation lines, a first of said photometric means being disposed in position for receiving the image of a first of said two graduation lines, a second of said photometric means being disposed in position for receiving the image of the second of said two graduation lines, each of said photometric means comprising a diaphragm having an aperture, image splitting optical means having an image splitting knife edge for splitting the graduation line image falling thereon into two image beam portions, a rotatable light chopping means disposed in the paths of said split image beam portions for allowing said split beams to alternately pass thereby, focusing means disposed in the path of said split image beam portions after said beam portions have passed said light chopping means for focusing said alternating beam portions at a common point, and photocell means disposed at the focusing point of said focusing means for receiving alternately the light from the split image portions of said line falling on said knife edge of said image splitting means, whereby the relative magnitudes of said image portions falling alternately on said photocell are a function of the position of said image of said line on said knife edge and cause varying electrical impulses from said photocell; image displacement means for causing a displacement of the images of said two graduation lines, said displacement means comprising a first pair of optical deviating elements and a second pair of optical deviating elements, said first pair of optical deviating elements comprising a first element and a second element coupled together for translation movement together in the same direction, said second pair of optical deviating elements comprising a first and second element coupled to each other for rotation in opposite directions, a first control means connected to said photocell of said first photometric means for controlling the displacement translation movement of said first pair of optical deviating elements as a function of the difference in magnitude of light alternately falling upon said photocell of said first photometric means, a second control means connected to said photocell of said photometric means for controlling the rotational movement of said second pair of optical deviating elements as a function of the difference in magnitude of light alternately falling upon said photocell of said second photometric means, a first element of said first pair of optical deviating elements and a first element of said second pair of optical deviating elements being disposed in series in the path of the rays of light from said first of said graduation lines to said first photometric means, and a second element of said first pair of optical deviating elements and a second element of said second pair of optical deviating elements being disposed in series in the path of the rays of light from said second of said graduation lines to said second photometric means, translation of said first pair of optical deviating elements causing image displacements of said graduation lines with respect to each knife edge of each of said image splitting means and causing variations in relative magnitudes between alternate portions of light falling on each of said photocells, said second pair of optical deviating elements causing image displacement of said graduation lines opposite to each other and with respect to each of said knife edges and causing variations in relative magnitudes between alternate portions of light falling upon said photocells through rotational movement, whereby the images of said graduation lines on said knife edges tend to attain a centered equilibrium position, thereby stabilizing the photocell control means, and means for determining the extent of movement of said displacement means for attaining said centered equilibrium position of said line images, the relative positions of said lines in the field of view thereby being the measuring unit for the fine adjustment in direct readout, whereby an accurate automatic readout and interpolation of the angular position of a graduated circle is obtained.

References Cited in the file of this patent

UNITED STATES PATENTS

| | | |
|---|---|---|
| 2,961,917 | Werner | Nov. 29, 1960 |
| 3,024,986 | Strianese et al. | Mar. 13, 1962 |
| 3,037,420 | Stade | June 5, 1962 |